US 6,695,748 B2

(12) United States Patent
Kopec et al.

(10) Patent No.: US 6,695,748 B2
(45) Date of Patent: Feb. 24, 2004

(54) TRANSMISSION CONTROL APPARATUS

(75) Inventors: Mark Kopec, Clarkston, MI (US); Eric Sandstrom, Oxford, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/940,082

(22) Filed: Aug. 28, 2001

(65) Prior Publication Data

US 2002/0032093 A1 Mar. 14, 2002

Related U.S. Application Data

(60) Provisional application No. 60/231,475, filed on Sep. 8, 2000.

(51) Int. Cl.[7] .............................................. F16H 61/26
(52) U.S. Cl. ...................................... 477/130; 74/606 R
(58) Field of Search ....................... 74/606 R; 73/118.1; 477/130

(56) References Cited

U.S. PATENT DOCUMENTS

| | | | |
|---|---|---|---|
| 3,709,070 A | * | 1/1973 | Lombard et al. ...... 74/606 R X |
| 4,688,449 A | | 8/1987 | Harada et al. |
| 4,738,159 A | * | 4/1988 | Kato et al. ................. 74/606 R |
| 4,805,490 A | * | 2/1989 | Fuehrer et al. ............ 74/606 R |
| 5,305,848 A | * | 4/1994 | Akutagawa et al. .. 74/606 R X |
| 5,314,616 A | * | 5/1994 | Smith ...................... 475/159 X |
| 5,426,991 A | | 6/1995 | Ohkawa et al. |
| 5,472,389 A | * | 12/1995 | Ando et al. ................... 477/130 |
| 5,505,287 A | * | 4/1996 | Asatsuke et al. ...... 74/606 R X |
| 5,575,190 A | | 11/1996 | Hirose |
| 5,599,247 A | | 2/1997 | Matsufuji |
| 5,611,372 A | * | 3/1997 | Bauer et al. ........... 74/606 R X |
| 5,669,479 A | | 9/1997 | Matsufuji |
| 5,676,026 A | | 10/1997 | Tsuboi et al. |
| 5,845,544 A | | 12/1998 | Huggins et al. |
| 5,879,259 A | | 3/1999 | Teraoka et al. |
| 5,884,206 A | | 3/1999 | Kim |
| 5,919,108 A | | 7/1999 | Takagi |
| 6,001,041 A | * | 12/1999 | Sawase et al. ............... 475/198 |
| 6,190,285 B1 | * | 2/2001 | Minowa et al. ....... 74/606 R X |
| 6,227,333 B1 | * | 5/2001 | Scheib et al. ......... 74/606 R X |
| 6,393,943 B1 | * | 5/2002 | Sommer et al. .......... 74/606 R |
| 6,438,481 B1 | * | 8/2002 | Carpenter et al. ............ 701/70 |

* cited by examiner

*Primary Examiner*—Ha Ho
(74) *Attorney, Agent, or Firm*—Reising, Ethington, Barnes, Kisselle, P.C.

(57) ABSTRACT

An electrohydraulic transmission control apparatus (10) that produces, controls and directs hydraulic pressure inputs to the clutches, brakes and shift mechanisms of an automatic transmission to shift the transmission. A module body (14) supports control apparatus components and is removably mountable to a transmission housing (16) of the transmission. The module body (14) defines a plurality of fluid conduits (28). A plurality of control valves (26) is disposed on the module body (14) and meter hydraulic fluid through the conduits (28) to brake and clutch hydraulic cylinders and shift mechanisms in the transmission. A plurality of solenoid-operated control valves (26) is also disposed on the module body. A controller (34) disposed on the module body is connected to the solenoids (30) and controls the valves by operating the solenoids (30) in accordance with inputs received from sensors (36–44) that detect various factors representing the running state of the transmission and the vehicle it's mounted in. A hydraulic oil pump (56) integrated into the apparatus (10) provides pressurized hydraulic oil to the control valves (26) and includes internal controller (34) software that directs calibration of the apparatus.

25 Claims, 8 Drawing Sheets

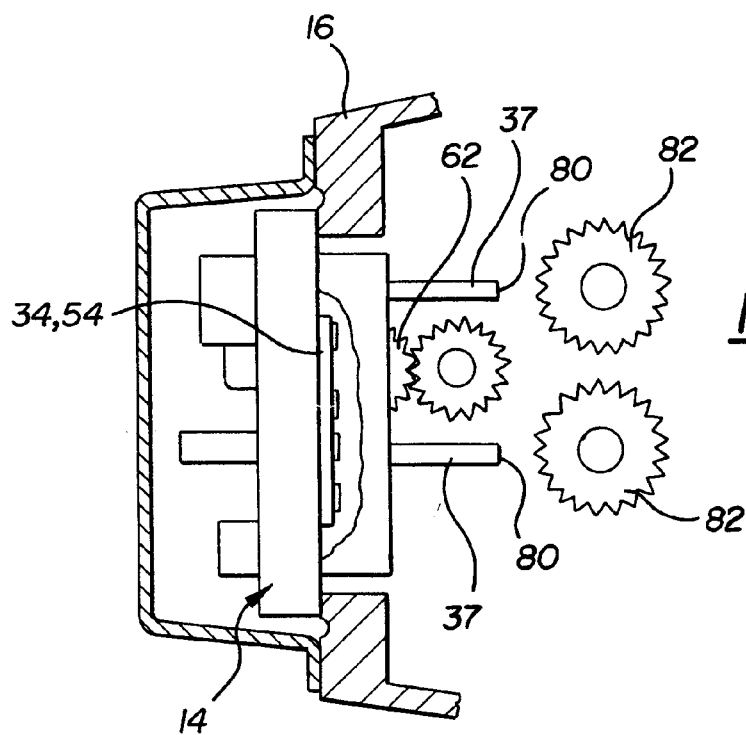
*FIG-10*
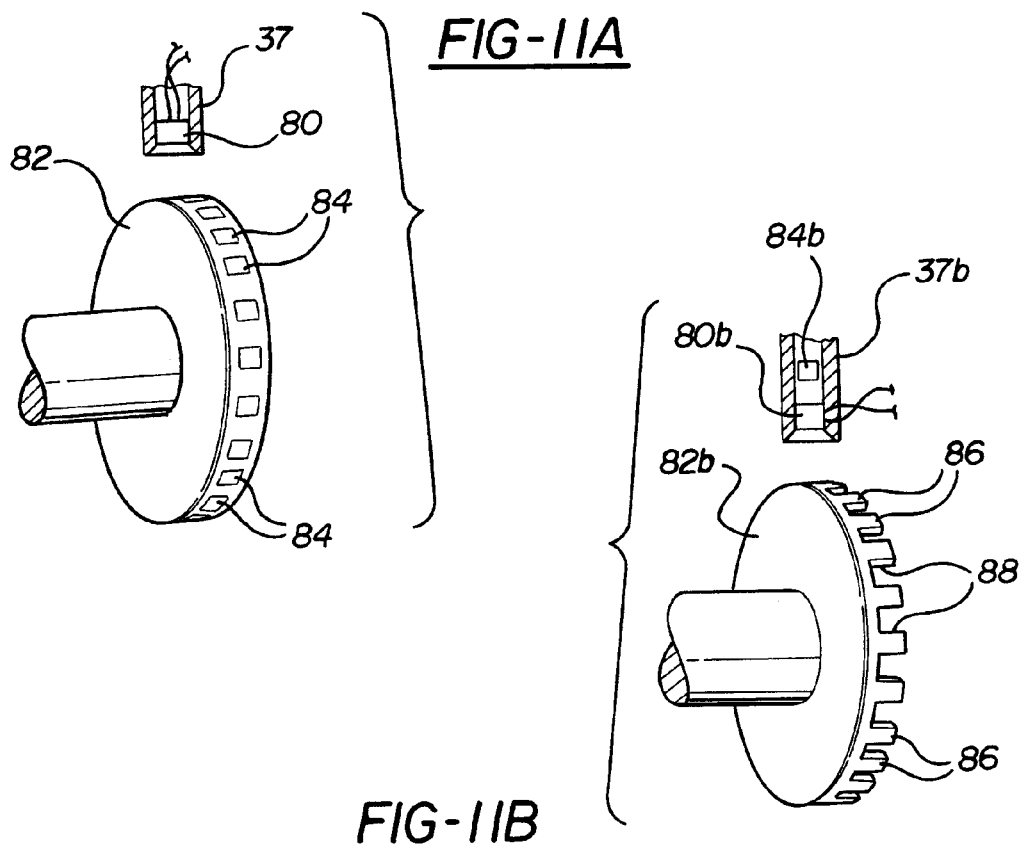
*FIG-11A*
*FIG-11B*

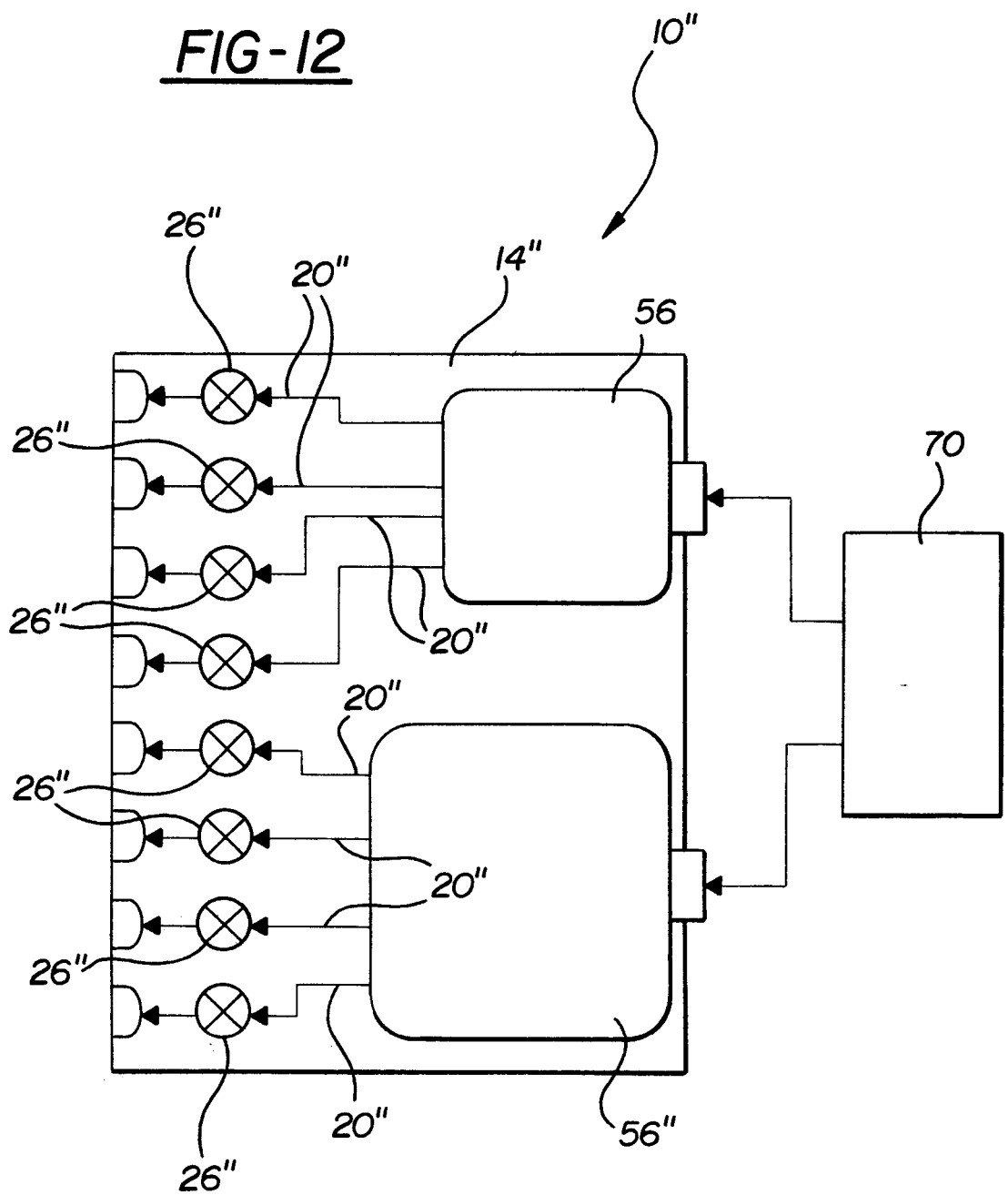

TRANSMISSION CONTROL APPARATUS

CROSS REFERENCE TO RELATED APPLICATIONS

This application claims priority from Provisional Application No. 60/231,475, filed Sep. 8, 2000, and entitled "TRANSMISSION CONTROL APPARATUS."

TECHNICAL FIELD OF THE INVENTION

This invention relates generally to a transmission control apparatus for producing, controlling and directing hydraulic pressure inputs to the clutch, brake and shift mechanism actuators of a transmission for automatically shifting the transmission.

INVENTION BACKGROUND

It is well known for an automatic transmission to include a torque converter and a transmission gear mechanism for automatically changing speed stages or gears of the transmission. The torque converter of such a transmission changes the rotational speed of an output shaft of an engine that the transmission is mounted to. The torque converter also transmits the resultant torque to a turbine shaft. The transmission gear mechanism of such a transmission changes the torque speed of the turbine shaft. The gear mechanism also transmits the resultant torque to drive wheels of the vehicle carrying the transmission. A typical transmission gear mechanism includes a planetary gear comprising a sun gear, a ring gear, pinion gears, a carrier, and friction elements. Friction elements typically include components such as clutches and brakes. Clutches are configured to engage a specified gear or carriers and to transmit torques to the engaged gear or carrier. Brakes are configured to alternately lock and release such gears and carriers. Different combinations of friction elements provide different gear ratios for transmitting torque from the engine output shaft to the drive wheels of the vehicle. These different combinations of gears are known as speed stages or simply as "gears" of the transmission. Automatic shifting between combinations of friction elements in an automatic transmission is commonly directed by a transmission controller.

Some transmission controllers include certain of their components in modules that mount on and plug directly into the transmission housings of their host transmissions, i.e., the transmissions that the controllers are to control. Some such modules mount to the host transmission housing by means of fasteners such as bolts or the like. For example, U.S. Pat. No. 5,845,544 issued Dec. 8, 1998 to Huggins et al. discloses a transmission control apparatus including a control module assembly that mounts and plugs into a transmission housing as a one-piece unit. Control module components are housed within a die-cast control module housing that removably mounts to the transmission housing by means of bolts or the like. The control module housing defines a plurality of internal electric and fluid connectors and conduits and is configured such that when the module housing is assembled to a transmission housing, the various conduits defined in the module housing align properly with corresponding conduits defined in the transmission housing.

A printed circuit board disposed in the Huggins et al. module housing includes an electronic controller. A bank of solenoid operated control valves are also disposed within the module housing and are connected to the electronic controller. A position sensor is mounted on an interior of the housing and interacts with a transmission shift shaft of the host transmission in such a way as to detect axial and rotational position changes of the shift shaft. The position sensor is connected to the electronic controller and provides signals to the controller—signals that indicate the axial and rotational position of the shift shaft. The electronic controller is programmed to control solenoid control valve operation in response to inputs received from sensors such as the position sensor. The Huggins et al. transmission control apparatus is designed to shift an auxiliary portion of a compound manual transmission rather than the main portion of an automatic transmission. The Huggins et al. transmission control uses air rather than hydraulic fluid as its power fluid and requires an external source of pressurized power fluid.

Similar to the Huggins et al. patent, U.S. Pat. No. 4,688,449 issued Aug. 25, 1987 to Harada et al. discloses a hydraulic transmission controller, portions of which are mounted directly to a transmission case of an automatic transmission. The Harada et al. controller selectively engages and disengages clutches and brakes in the transmission thereby effecting gear changes in the transmission over four automatically selected forward speed gears including an overdrive and a manually selected reverse gear. The controller effects the gear changes in accordance with various inputs such as throttle opening of an engine connected to the transmission and the running speed of a vehicle carrying the engine and transmission. The hydraulic controller includes solenoid valves that meter hydraulic fluid to effect the gear changes. The Harada et al. transmission controller cannot, however, shift the transmission it is mounted to without receiving pressurized hydraulic fluid from a separate fluid pump and without inputs from remotely mounted sensors.

A problem inherent in known automatic transmission control systems such as those described above is system variation caused by variations in such factors as pump and solenoid output flow and/or pressure as well as in valve leakage and spring loads. The consequences of system variation in an automatic transmission include reduced fuel economy and drive quality.

What is needed is a hydraulic transmission control apparatus that can automatically shift an automatic transmission without requiring power fluid input from a remote source. What is also needed is such an apparatus that does not require inputs from remotely mounted sensors and that has significantly lower system variation than known systems.

INVENTION SUMMARY

A transmission control apparatus is provided for producing, controlling and directing hydraulic pressure inputs to the clutches, brakes and shift mechanisms of an automatic transmission. The apparatus includes a control module body that mounts on and plugs into an automatic transmission housing as a one-piece unit. Control module components are supported on a module body configured to removably mount to a transmission housing of the transmission, the module body defining a plurality of fluid connectors and conduits. Control valves are disposed on the module body and are configured to meter hydraulic fluid to brake and clutch hydraulic cylinders and/or shift mechanisms in the transmission. Solenoids disposed on the module are connected to respective ones of the control valves and are configured to operate the respective control valves that they are connected to. A controller is connected to the solenoid valves and is configured to control the control valves by operating the solenoids in accordance with inputs received from sensors that detect various factors representing the running state of an associated vehicle drive train. The apparatus also includes a hydraulic oil pump configured to provide pressurized hydraulic oil to the control valves.

Unlike the prior art, the hydraulic oil pump is connected directly to and is supported on the module body. Therefore, a transmission control apparatus constructed according to the invention does not require a remote pressurized source of hydraulic fluid such as a transmission fluid pump that is connected, for example, to the hub of a transmission torque converter.

A transmission control apparatus constructed according to the invention has the additional advantages of greater reliability, easier packaging, lower weight and cost, a simplified logistics and assembly process, and a reduction in system variation achieved by allowing calibration of the control apparatus before the module is delivered to a customer.

BRIEF DRAWING DESCRIPTION

To better understand and appreciate the invention, refer to the following detailed description in connection with the accompanying drawings:

FIG. 10 is a fragmentary schematic cross-sectional end view of the transmission control apparatus and transmission of FIG. 8 with the transmission control apparatus cut away to reveal an electronic transmission control unit;

FIG. 11A is a schematic perspective view of a first sensor wheel embodiment of the transmission control apparatus of FIG. 8;

FIG. 11B is a schematic perspective view of a second sensor wheel embodiment of the transmission control apparatus of FIG. 8; and FIG. 12 is a schematic view of an alternative transmission control apparatus embodiment including two hydraulic oil pumps shown connected to a hydraulic oil source.

DETAILED DESCRIPTION

Figure 1:
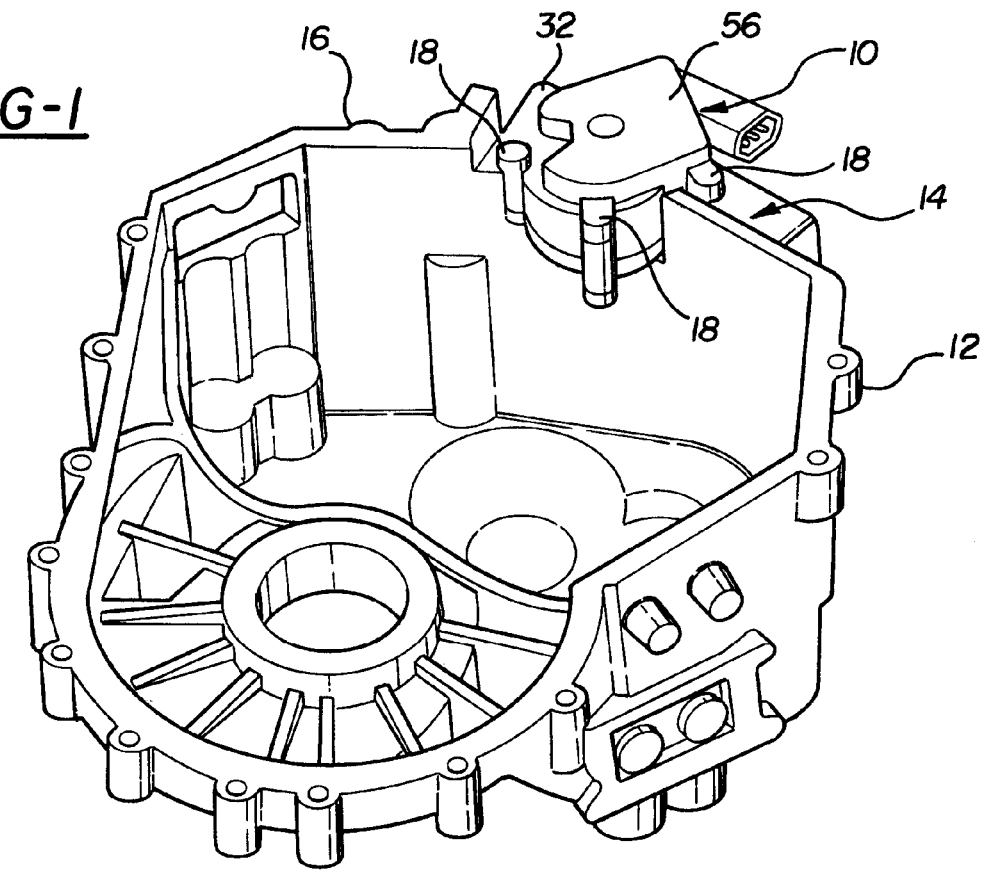
FIG. 1 is a perspective view of a transmission control apparatus constructed according to the invention and mounted on a transmission housing.

A first embodiment of a transmission control apparatus for producing, controlling and directing hydraulic pressure inputs to the clutches, brakes and shift mechanisms of an automatic transmission for the purpose of shifting the transmission, is shown at 10 in the drawings. Second and third transmission control apparatus embodiments are shown at 10' and 10", respectively, in the drawings. Those structures shown in drawings of the second and third embodiments that correspond to similar items in the first embodiment are identified with primed and double-primed numerals, respectively. Identical items carry the same numerals.

Figure 3:
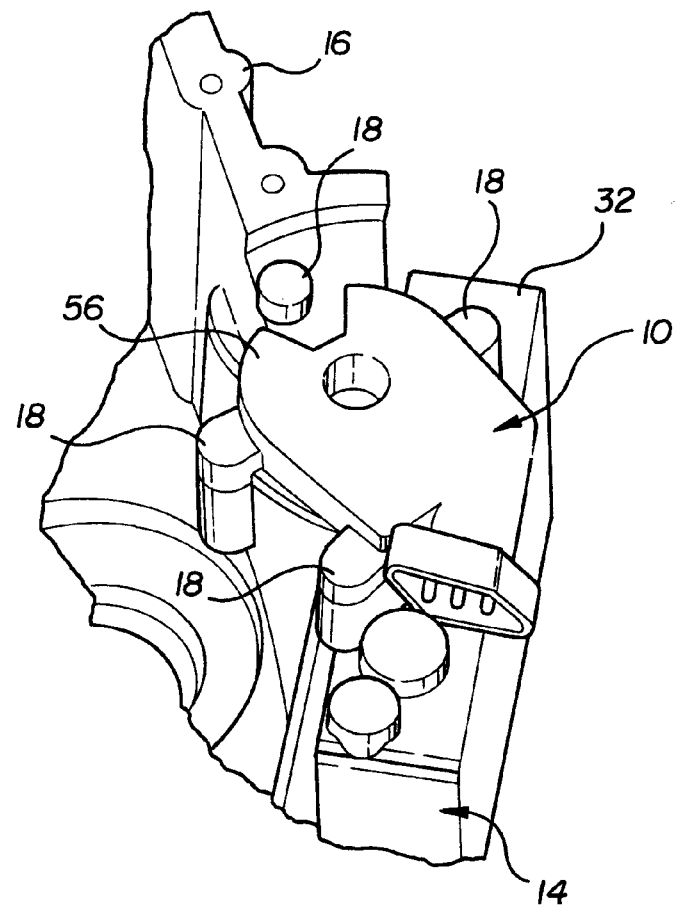
FIG. 3 is a fragmentary perspective magnified view of the transmission control apparatus of FIG. 1.
Figure 6:
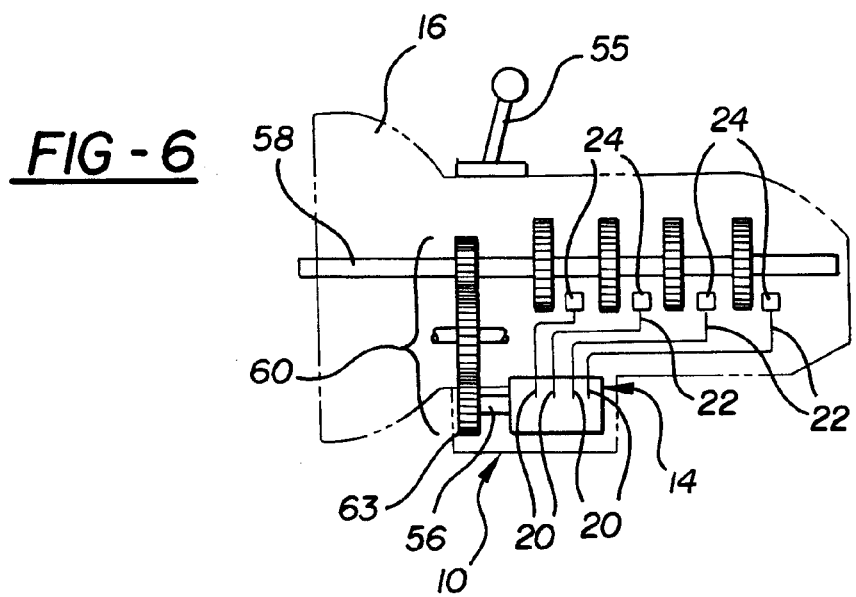
FIG. 6 is a schematic side view of a transmission control apparatus constructed according to the invention and mounted on a transmission with a hydraulic oil pump portion of the apparatus shown connected to a torque converter output shaft of the transmission by a gear set.

The apparatus 10 is an integrated modular unit that includes a modular body 14 designed to mount on and plug into an automatic transmission housing such as the transmission housing shown at 16 in FIGS. 1, 3 and 6. The transmission control apparatus 10 is configured to selectively engage and disengage clutches, brakes and shift mechanisms in the transmission in such a way as to effect gear changes in the transmission over 6 automatically selected forward speed gears and a manually selected or electrohydraulically selected and controlled reverse gear. (Other embodiments of the transmission control apparatus 10 may be configured to engage and disengage clutches brakes and shift mechanisms so as to effect gear changes in either more or less than 6 forward speed gears.) All the components of the transmission control apparatus 10 are supported on the modular body 14. The modular body 14 is die cast of a metallic material in the shape that allows the modular body 14 to be removably mounted to the transmission housing 16. The modular body 14 is configured to removably mount to the transmission housing 16 by means of fasteners shown at 18 in FIGS. 1, 3 and 4. The fasteners 18 extent through circular through holes formed in the modular body 14 and into holes formed in the transmission housing 16. In other embodiments, the modular body 14 may be constructed of any suitable material and by any suitable means.

Figure 5:
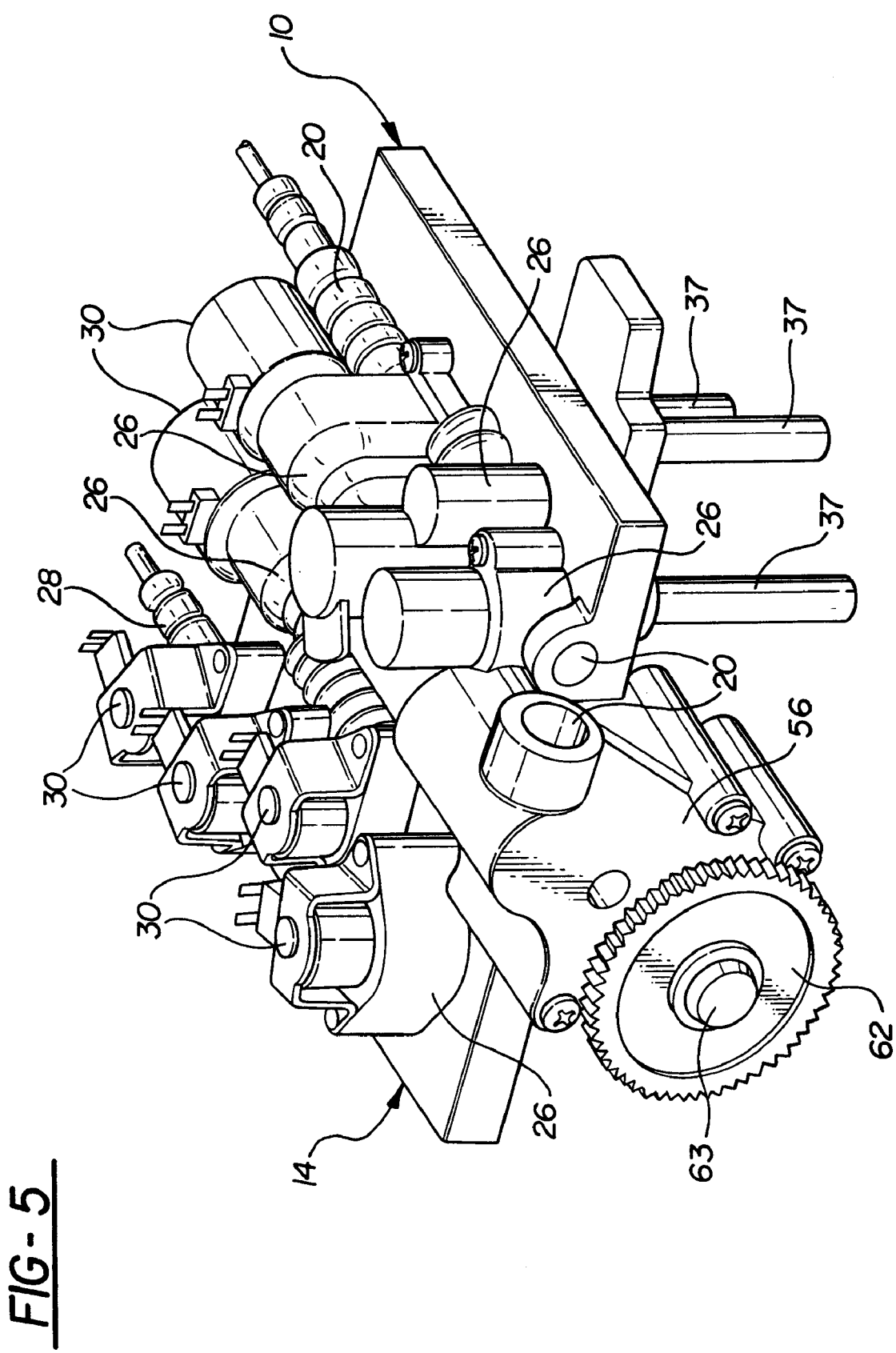
FIG. 5 is a perspective view of the transmission control apparatus of FIG. 1 with a module housing of the apparatus removed to reveal solenoid and speed sensor portions of the apparatus.

The modular body 14 is also cast in such a way as to define a plurality of interior fluid connectors and conduits or oil passages 20. The modular body 14 is also shaped in such a way that when the modular body 14 is assembled to a transmission housing 16, the various conduits 20 defined in the modular body 14 will properly align with corresponding conduits 22 defined in the transmission housing 16. The hydraulic oil passages 20, 22 are configured to connect and provide communication between the valves and hydraulic cylinders 24 of the brakes, clutches and linear or rotary shift mechanisms of the transmission. As is best shown in FIG. 5, a plurality of control valves 26 is disposed on the modular body 14 along the hydraulic oil passages 20. The control valves 26 are configured to meter hydraulic fluid through the hydraulic oil passages 20 to the hydraulic cylinders 24 in the transmission so as to control known brake and clutch assemblies in the transmission. When used to operate a dual-clutch transmission (DCT), the apparatus controls each of two clutches included in the transmission as well as linear hydraulic actuators used for gear selection.

The modular body 14 is configured to accommodate a plurality of internal electrical connectors and conduits 28. The electrical conduits 28 are configured to provide a path for electrical current paths such as wire, flex cable or leadframe to extend between and connect an electronic controller 34 to solenoids 30 that actuate the control valves 26. The solenoids 30 are also supported on the modular body 14 and are described in greater detail below.

Figure 2:
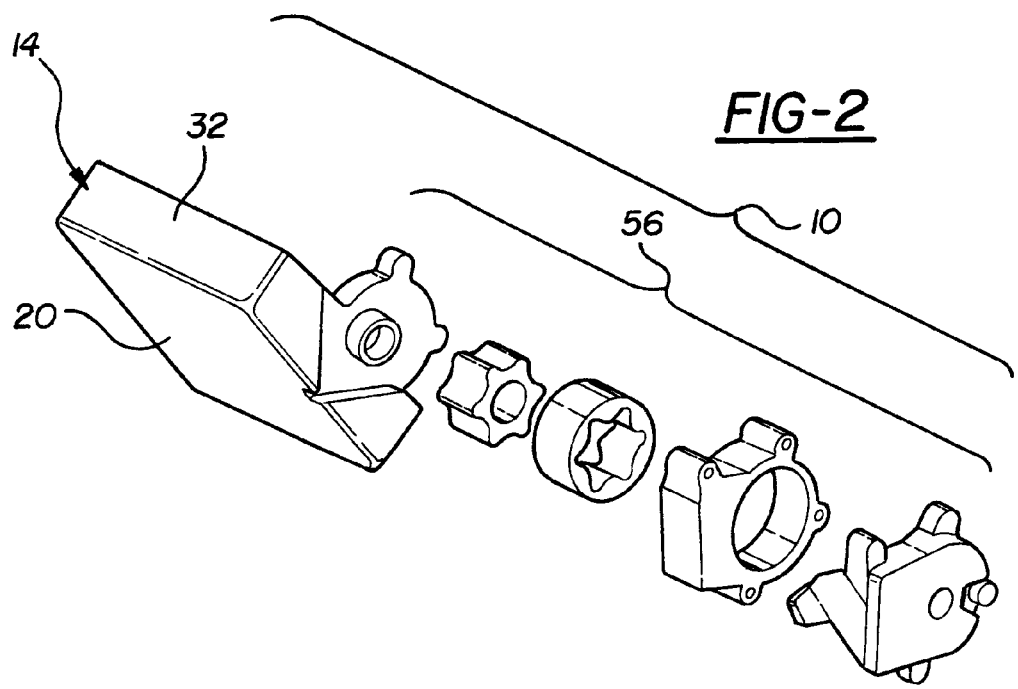
FIG. 2 is a perspective view of the transmission control apparatus of FIG. 1 with the components of an hydraulic oil pump portion of the apparatus exploded.

A cover member or modular housing 32 (shown in FIGS. 1, 2 and 4) is connected to the modular body 14 and covers the other components of the assembly including the pump 56, the solenoids 30 and the control valves 26. The cover member 32 also provides electrical connections to the solenoids 30, motors, sensors 36–44 and the electronic controller 34.

As is best shown in FIG. 5, the solenoids 30 are mechanically connected to respective ones of the control valves 26 and are electrically connected to the electronic controller 34. The solenoids 30 are configured to operate the respective control valves 26 that they are connected to in response to control signals from the electronic controller 34.

Figure 7:
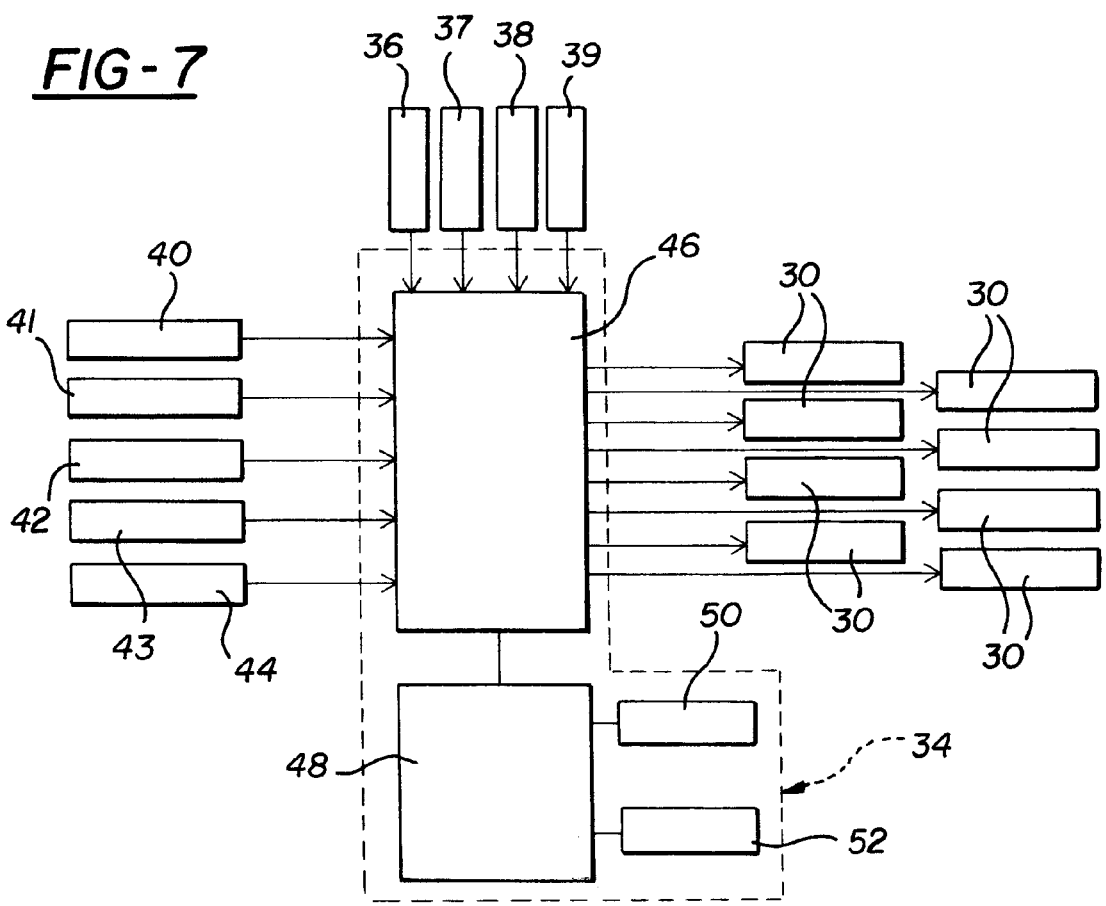
FIG. 7 is a block diagram of shift controller, sensors and solenoids of the invention.
Figure 8:
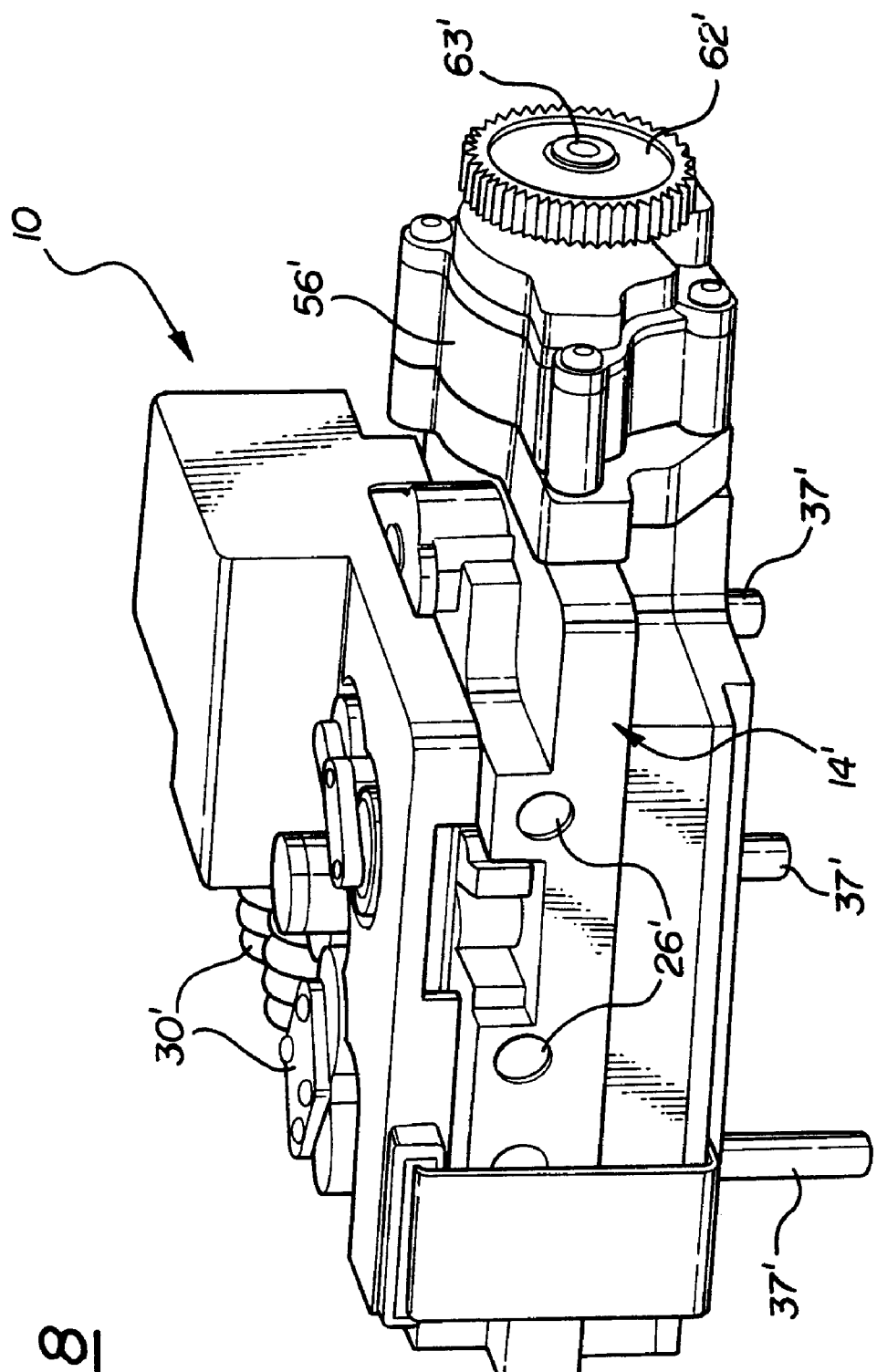
FIG. 8 is a perspective view of a transmission control apparatus constructed according to a second embodiment of the invention.
Figure 9:
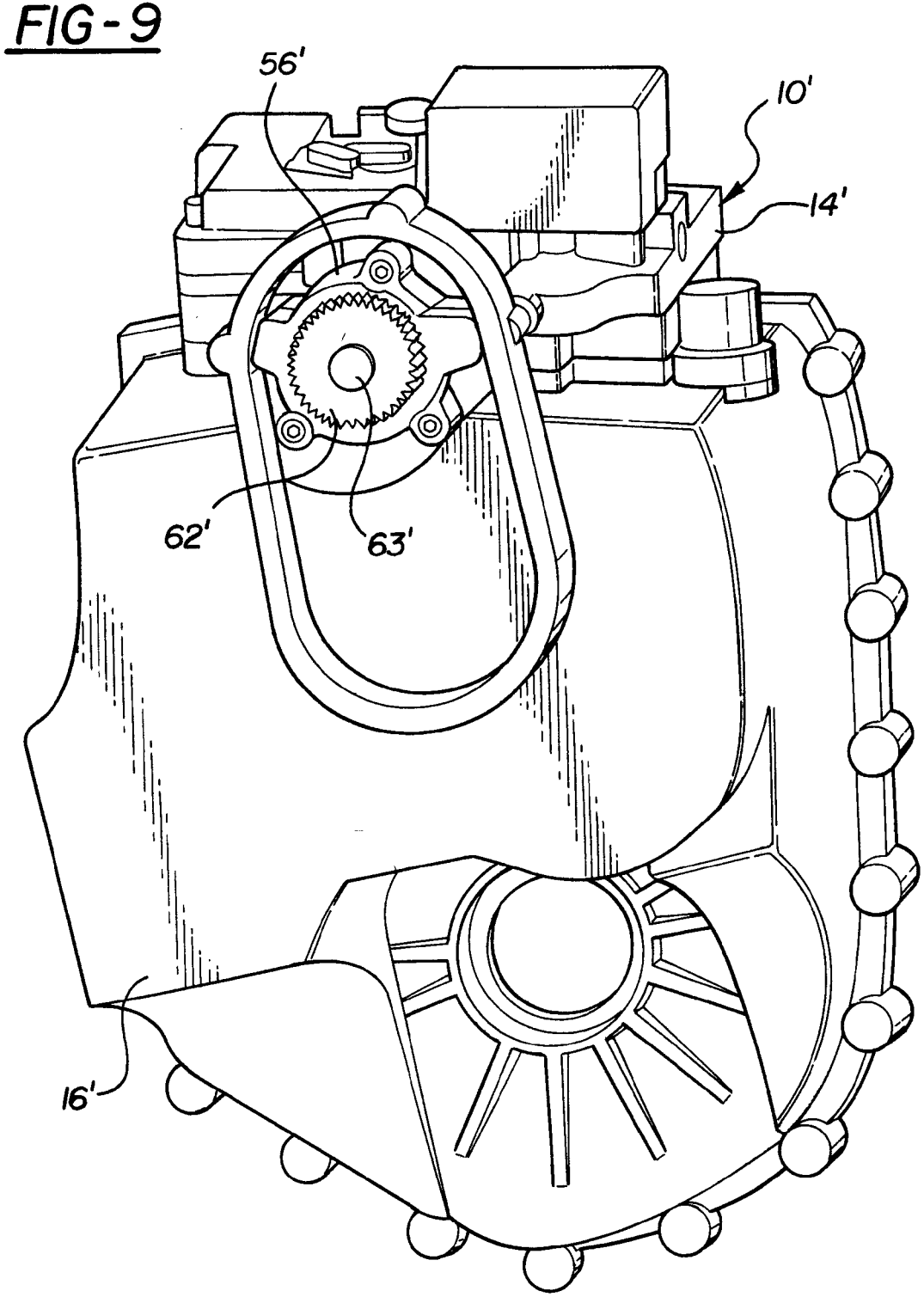
FIG. 9 is a perspective view of the transmission control apparatus of FIG. 8 mounted on a transmission case.

As shown in FIG. 7, the electronic controller 34 is configured to control the control valves 26 by operating the control valve solenoids 30 in accordance with inputs received from sensors 36–44 that detect various factors representing the running state of the vehicle that the modular and transmission are installed in. The controller 34 includes a computer programmed to operate the control valves 26 by sending control signals to the control valve solenoids 30. The computer receives inputs from the sensors 36–44 through an I/O port 46. The I/O port also serves as an output port for control signals from the computer to the solenoid valves. The computer includes a central processor unit (CPU) 48 and random access memory (RAM) 50 for shift point processing. The computer also includes a read-only memory (ROM) 52 for storing shift pattern data such as shift points and lock-up points. The electronic controller 34 controls shift functions as well as launch and cooling functions of a host transmission.

Figure 4:
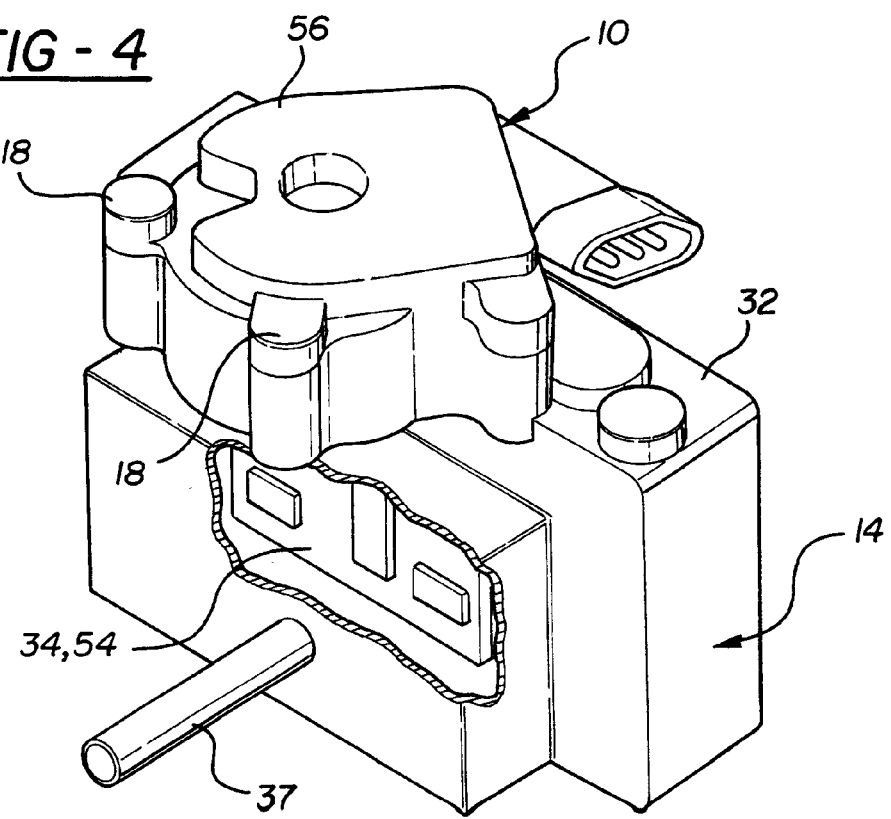
FIG. 4 is a perspective view of the transmission control apparatus of FIG. 1 detached from the transmission housing.

The computer is embodied in a ceramic hybrid circuit board 54 that is supported on the modular body 14 and within the modular housing 32 as shown in FIG. 4. Therefore, the ceramic hybrid board includes the electronic controller 34. As shown in FIG. 10, a printed circuit board 54' may be used in lieu of the ceramic hybrid board 54.

The sensors 36–44 that the controller 34 receives inputs from include both internal sensors 36–39 and remote sensors 40–44. The internal sensors 36–39 are supported by the modular body 14 and are fully integrated into the apparatus (10). The internal sensors 36–39 include a temperature sensor 36, shaft speed (including input and output) sensors 37, a linear or rotational position sensor 38 and a pressure sensor 39. The sensors 36–44 are configured to detect various factors representing the running state of the vehicle. The pressure sensor 39 senses hydraulic fluid pressure changes in a hydraulic conduit 20 within the modular body 14.

The speed sensors 37 extend into a host transmission housing 16 from the modular body 14 and are positioned and configured to detect the rotational speed of rotating components within the transmission case. The speed sensors 37 include hall-effect sensors 80 that sense magnetic field interruptions as a means of determining the rotational speed of sensor wheels or "trigger wheels" 82. The hall-effect sensors 80 are mounted in respective locations that are radially spaced from respective outer circumferences of respective corresponding trigger wheels 82. The trigger wheels 82 are mounted on or operatively connected to rotating transmission components whose rotational speed is to be measured. As the subject transmission components rotate, the trigger wheels 82 rotate past the hall-effect sensors 80. The hall-effect sensors 80 measure the rotational speed of the trigger wheels 82 and send corresponding signals to the controller 34.

One type of hall-effect sensor arrangement is shown at 80 in FIG. 11A. According to this arrangement, a plurality of magnets 84 is mounted around an outer circumference of the trigger wheel 82. As the magnetic fields of the magnets 84 pass across the hall-effect sensor 80 they induce an electrical current that the hall-effect sensor converts into an output pulse to the controller 34. The controller measures trigger wheel rotational speed by counting the number of output pulses that the controller receives from the hall-effect sensor 80 over time.

Another type of hall-effect sensor arrangement is shown at 80b in FIG. 11B. According to this arrangement, a single fixed magnet 84b is mounted on a side of the hall-effect sensor 80b opposite the corresponding trigger wheel 82b. The trigger wheel 82b in this arrangement is made of steel and includes a plurality of circumferentially spaced teeth 86 that define periodic spaces 88 around the outer circumference of the trigger wheel 82b. The hall-effect sensor 80b sends output pulses to the controller 34 that correspond to the interruptions that the teeth 86 cause in the magnetic field of the fixed magnet 84b.

Examples of external sensors that may be connected to the controller 34 by electrical wiring include a throttle-opening sensor 38 that detects the amount of accelerator pedal depression, a vehicle speed sensor 40, and a main transmission output shaft speed sensor 42. Another external sensor that the controller 34 may receive inputs from is a shift lever position sensor 44 configured and positioned to interact with a transmission shift shaft in such a way as to detect axle and rotation position changes of the shift shaft.

The apparatus 10 includes an integrated hydraulic oil pump 56 configured to provide pressurized hydraulic oil to the control valves 26. As shown in FIG. 6, the hydraulic oil pump 56 is connected directly to and is supported on the modular body 14. The oil pump 56 is connected to and is mechanically driven by the engine side, i.e., by the input side of a torque converter. The input side of the torque converter is connected to the output shaft 58 of the torque converter through an interconnecting gear set shown at 60 in FIG. 6, and one gear of which is shown at 62 in FIG. 5 that connects to pump drive shaft 63. Where the transmission is a dual-clutch transmission, the oil pump is connected to and is mechanically driven by an engine side of a clutch of a dual clutch transmission. The oil pump 56 is configured to provide pressurized hydraulic oil to the control valves 26 through the internal fluid communication channels 20.

The controller 34 is programmed to apply a self-calibration process to the transmission control apparatus 10 that adjusts electronically stored values. Because the apparatus 10 is completely integrated and includes a dedicated hydraulic pump 56, the apparatus 10 can be calibrated as a unit to minimize output variability. Integration of the pump 56 also allows the apparatus 10 to be calibrated at any time during its service life, e.g. before delivering it to an end customer. Calibration negates variations in pump flow, solenoid flow and/or pressure, valve flow and/or pressure, internal and external leakages of the complete apparatus 10, and pressure drops through the communication channels 20. The system may alternatively be calibrated using known mechanical techniques.

In other embodiments such as the transmission control apparatus 10" shown schematically in FIG. 12, one or more additional oil pumps 56" may be supported on a modular body 14" and connected to one or more control valves 26" to provide pressurized hydraulic oil to those valves 26". The pumps 56, 56" receive hydraulic oil from a hydraulic oil source 70 such as a transmission sump. The first pump 56 may, in such embodiments, deliver hydraulic oil to certain ones of the control valves 26 at one pressure and flow rate and the second and additional pumps 56" may be used to deliver oil to other ones of the control valves 26 at different pressures and/or flow rates. In either case, the pump 56 or pumps 56, 56" may be either mechanically or electrically driven.

In practice, a transmission control apparatus may be constructed according to the invention by fabricating the module body 14 to have a shape that allows it to be removably mounted to a transmission housing. The module body 14 is also shaped to include the fluid connectors and conduits 20 described above. The fluid-metering control valves 26 are then mounted on the module body 14 and the controller 34 is constructed and programmed to control the control valves 26 by operating the valves in accordance with inputs received from the sensors 36–44. The controller 34 is connected to the control valves 26 and internal sensors 36–39. The hydraulic oil pump 56 is then mounted on the module body 14 in a position to provide pressurized hydraulic oil to one or more of the control valves 26. If the apparatus is to include more than one pump 56, 56", then any additional pumps 56" are also mounted on the module body 14 in respective positions to provide pressurized hydraulic oil to one or more of the control valves 26.

Once the apparatus 10 has been assembled as described above it may then be calibrated before mounting the apparatus 10 to a transmission. This integrated calibration may be accomplished by known mechanical means or by programming the controller 34 to self-calibrate the apparatus 10.

A transmission control apparatus constructed according to the invention integrates a hydraulic pump and an electronic solenoid-based control system into a single stand-a-lone modular apparatus that plugs into a transmission case, and mates with essential features of the transmission such as mechanical linkages, fluid channels, and electrical circuits. This design provides improved efficiency because many features, such as internal hydraulic passages, hydraulic interfaces and the pump and the control system share mechanical interfaces to the case. because the apparatus is a one-piece unit and is fully integrated, the assembly of the transmission is simplified as compared to prior art arrangements wherein the hydraulic pump is a separate transmission component and the control system is mounted separately with separate mechanical, electrical and hydraulic interfaces to the case. Another benefit of the design is that, because the components of the apparatus 10 can be calibrated together, more consistent performance can be achieved across a large number of mass-produced units.

This description illustrates certain embodiments of the invention and is not intended to limit the scope of the invention. For this reason, descriptive rather than limiting words have been used. Obviously, it's possible to modify this invention from what the description teaches. Within the scope of the claims, one may practice the invention other than as described.

What is claimed is:

1. A transmission control apparatus (10) for producing, controlling and directing hydraulic pressure inputs to an automatic transmission for operating the transmission, the apparatus comprising:
    a module body (14) configured to removably mount to a transmission housing (16) of the transmission, the module body defining a plurality of fluid connectors and conduits (28);
    a plurality of control valves (26) disposed on the module body (14) and configured to meter hydraulic fluid to the transmission;
    a plurality of solenoids (30) disposed on the module body (14) and operatively connected to respective ones of the control valves (26);
    a controller (34) connected to the solenoids (30) and configured to control the control valves (26) by operating the solenoids (30) in accordance with inputs received from sensors (36–44) that detect various factors representing the running state of the vehicle the apparatus (10) is installed in; and
    a hydraulic oil pump (56) integrated into the apparatus (10) and configured to provide pressurized hydraulic oil to the control valves (26) whereby the apparatus (10) provides a stand-alone transmission control that does not require an external source of pressurized hydraulic fluid.

2. A transmission control apparatus (10) as defined in claim 1 in which at least one of the sensors (36–44) is supported on the module body (14).

3. A transmission control apparatus (10) as defined in claim 2 in which at least one of the sensors (36–44) supported on the module body (14) is a pressure sensor (39) configured to sense hydraulic fluid pressure changes in a hydraulic conduit (20) within the module body (14).

4. A transmission control apparatus (10) as defined in claim 1 in which the module body (14) comprises die cast metal.

5. A transmission control apparatus (10) as defined in claim 1 in which the module body (14) is configured to removably mount to the transmission housing (16) by means of fasteners (18) that extend through holes formed in the module body (14) and into holes formed in the transmission housing (16).

6. A transmission control apparatus (10) as defined in claim 1 in which the module body (14):
    is configured such that when the module body (14) is assembled to a transmission housing (16), the various conduits (28) defined in the module body (14) will properly align with corresponding conduits (28) defined in the transmission housing (16).

7. A transmission control apparatus (10) as defined in claim 6 in which the oil pump (56) is configured to provide pressurized hydraulic oil to the control valves (26) through the internal fluid conduits (28).

8. A transmission control apparatus (10) as defined in claim 1 in which the module body (14) defines a plurality of internal electrical conduits (28) configured to provide paths for electrical current paths to extend through.

9. A transmission control apparatus (10) as defined in claim 1 in which a module housing (16) is connected to the module body (14) and covers other components of the apparatus.

10. A transmission control apparatus (10) as defined in claim 1 in which the controller (34) is configured to selectively engage and disengage clutches and brakes in the transmission.

11. A transmission control apparatus (10) as defined in claim 1 in which the apparatus includes a position sensor (38) connected to the controller (34) and configured to detect position changes of a shift shaft of the transmission, the position sensor (38) being configured to provide signals to the controller (34) that indicate shift shaft movement.

12. A transmission control apparatus (10) as defined in claim 1 in which the controller (34) is supported on the module body (14).

13. A transmission control apparatus (10) as defined in claim 9 in which the controller (34) is supported within the module housing (16).

14. A transmission control apparatus (10) as defined in claim 1 in which the controller (34) receives inputs from remote and internal sensors (36–44).

15. A transmission control apparatus (10) as defined in claim 1 in which a printed circuit board is supported on the module body (14) and includes the controller (34).

16. A transmission control apparatus (10) as defined in claim 1 in which the controller (34) includes a computer programmed to control the control valves (26) by sending control signals to the solenoids (30).

17. A transmission control apparatus (10) as defined in claim 1 in which the oil pump (56) is connected to and is mechanically driven by an input side of a torque converter of the transmission that the apparatus (10) is connected to.

18. A transmission control apparatus (10) as defined in claim 17 in which the oil pump (56) is connected to the input side of the torque converter through an interconnecting gear set (60).

19. A transmission control apparatus (10) as defined in claim 1 in which the oil pump (56) is configured to be connected to and mechanically driven by an engine side of a dual clutch transmission.

20. A transmission control apparatus (10) as defined in claim 1 in which the controller (34) is configured to apply a self-calibration process to the transmission control apparatus (10) that adjusts electronically stored values.

21. A transmission control apparatus (10) as defined in claim 1 in which the apparatus (10) is configured to be mechanically calibrated.

22. A method of fabricating a transmission control apparatus (10) for producing, controlling and directing hydraulic pressure inputs to an automatic transmission for operating the transmission, the method including the steps of:
   providing a module body (14) configured to removably mount to a transmission housing (16) of the transmission, the module body (14) defining a plurality of fluid connectors and conduits (28);
   supporting a plurality of fluid-metering control valves (26) on the module body (14);
   connecting to the valves a controller (34) configured to control the control valves (26) by operating the valves in accordance with inputs received from sensors (36–44);
   supporting a hydraulic oil pump (56) on the module body (14) in a position to provide pressurized hydraulic oil to one or more of the control valves (26).

23. The method of claim 22 including the additional step of calibrating the apparatus (10).

24. The method of claim 23 in which the apparatus (10) is calibrated before the apparatus is mounted to an automatic transmission.

25. The method of claim 22 including the additional step of supporting a second hydraulic pump (56) on the module body (14) in a position to provide pressurized hydraulic oil to one or more of the control valves (26).

* * * * *